UNITED STATES PATENT OFFICE.

JOSEPH D. JONES, OF BROOKLYN, NEW YORK.

IMPROVEMENT IN COVERINGS FOR STEAM-BOILERS.

Specification forming part of Letters Patent No. 133,037, dated November 12, 1872.

*To all whom it may concern:*

Be it known that I, JOSEPH D. JONES, of Brooklyn, in the county of Kings and State of New York, have invented a new and Improved Boiler-Covering, of which the following is a specification:

My invention consists of a non-conducting boiler-covering, composed of two layers or coatings—the first being made of powdered asbestus mixed with linseed-oil, and then mixed with clay and cotton, and rendered pasty by the addition of water, so that it can be spread out smoothly and evenly, which is spread on the boiler while hot, say from a quarter to a half inch thick, and allowed to harden by the heat. Then the second layer, consisting of clay, with a large proportion of cane fiber and horse or cattle hair; also coal or bone dust, and saw or cork dust, suitably mixed, and prepared in a pasty condition, is spread on about an inch, more or less, thick, and over this, while in a tacky state, is spread a thin layer of Sisal or Manila hemp or other long fiber, as a binding to prevent cracking. A finish of whitewash, paint, or other suitable dressing may be applied on the binding fiber if necessary. The first coating is more particularly used for its fire-proof qualities, while the outer one is used more particularly as a non-conductor, being equally as good for that purpose as the inner one, and much cheaper, and is better in respect of being less liable to crack by the heat.

In preparing the first coating, I mix about one-third ground asbestus (in sufficient oil to make it pasty) with about two-thirds clay. I then mix one hundred pounds of this compound with about fifteen pounds of cotton, water enough being added to make a paste. In preparing my second coating, I use about one hundred pounds of clay, twenty-five pounds of cane fiber, forty pounds of hair, one peck of coal-dust, and a half-bushel of saw-dust, enough water being added to make a mortar, and enough hemp to form an external layer.

I am aware that the use of asbestus in connection with other ingredients for forming a compound for boiler-covers was made known to the public in patent granted to William Peters August 26, 1862. I am also aware of the patents granted to W. T. Kosinski and J. Riley, respectively, September 13 and October 4, 1870; and I am also aware that the several ingredients in my compound have been used heretofore, either separately or in partial combinations. I have, however, discovered by actual observation that no compound consisting of ingredients differing from those I employ fully meets the requirements of an efficient boiler covering, and hence have instituted numerous experiments and expended much thought in discovering what constitutes my present invention.

The advantages of this invention are as follows: First, it can be applied to the boiler while hot and in actual use; secondly, by applying the costly inner coating in a thin layer, while the cheap outer coating is applied in a thick layer, great economy in the cost is secured, while at the same time all the requirements of a non-combustible and a non-heat conducting cover are fully obtained.

Having thus described all that is necessary to a full understanding of my invention, what I claim as new, and desire to protect by Letters Patent, is—

A boiler covering consisting of two coatings, the first formed of powdered asbestus, linseed-oil, clay, and cotton fiber (to form an inner coating,) and the second of clay, cane fiber, hair, coal-dust, saw-dust, and hemp, (to form the outer covering,) all combined and applied, substantially in the manner specified, for the purpose set forth.

JOS. D. JONES.

Witnesses:
T. B. MOSHER,
ALEX. F. ROBERTS.